(12) United States Patent
Palinckx et al.

(10) Patent No.: US 12,740,663 B2
(45) Date of Patent: Sep. 22, 2026

(54) HAND-OPERATED COFFEE PRESS

(71) Applicant: SUPERKOP BV, Herpt (NL)

(72) Inventors: Sabine Palinckx, Herpt (NL); Geert Kaal, Herpt (NL)

(73) Assignee: SUPERKOP BV, Herpt (NL)

( * ) Notice: Subject to any disclaimer, the term of this patent is extended or adjusted under 35 U.S.C. 154(b) by 812 days.

(21) Appl. No.: 18/247,403

(22) PCT Filed: Oct. 4, 2021

(86) PCT No.: PCT/EP2021/077273
§ 371 (c)(1),
(2) Date: Mar. 30, 2023

(87) PCT Pub. No.: WO2022/073918
PCT Pub. Date: Apr. 14, 2022

(65) Prior Publication Data

US 2024/0023747 A1 Jan. 25, 2024

(30) Foreign Application Priority Data

Oct. 5, 2020 (NL) .................................... 2026620

(51) Int. Cl.
*A47J 31/38* (2006.01)

(52) U.S. Cl.
CPC .................................... *A47J 31/38* (2013.01)

(58) Field of Classification Search
CPC ........ A47J 31/10; A47J 31/36; A47J 31/3604; A47J 31/3609; A47J 31/3614; A47J 31/3666; A47J 31/3671; A47J 31/38
See application file for complete search history.

(56) References Cited

U.S. PATENT DOCUMENTS

| | | | | |
|---|---|---|---|---|
| 10,182,678 | B2 | 1/2019 | Landau | |
| 2007/0227363 | A1 | 10/2007 | Verna | |
| 2018/0055274 | A1* | 3/2018 | Landau | A47J 31/0663 |
| 2020/0260903 | A1* | 8/2020 | Widmer | A47J 31/4489 |

FOREIGN PATENT DOCUMENTS

| | | | | |
|---|---|---|---|---|
| EP | 2644066 | A1 * | 10/2013 | A47J 31/38 |
| GB | 2482890 | A | 2/2012 | |
| WO | 03/101264 | A1 | 12/2003 | |
| WO | 2017009186 | A | 1/2017 | |
| WO | 2022/073918 | A1 | 4/2022 | |

OTHER PUBLICATIONS

ISR/WO from parent matter PCT/EP2021/077273 dated Nov. 11, 2021.

* cited by examiner

*Primary Examiner* — Justin C Dodson
(74) *Attorney, Agent, or Firm* — Vorys, Sater, Seymour and Pease, LLP; Iona N. Kaiser

(57) ABSTRACT

The current invention relates to a hand-operated coffee press comprising: (a) a pressing assembly comprising a post, a pushing rod and a lever, wherein (i) said lever is rotably coupled to an axial end of said post, and wherein said lever and said post are configured to rotate about an eccentrical axis, and (ii) said lever is rotably coupled to an axial end of said pushing rod, and wherein said lever and said pushing rod are configured to rotate about a centrical axis, (b) a brewing assembly comprising a portafilter, a liquid container and a piston, wherein the pushing rod comprises a first pin and the piston comprises a toothed comb, wherein the first pin and the toothed comb are releasable coupled to each other.

15 Claims, 8 Drawing Sheets

HAND-OPERATED COFFEE PRESS

FIELD OF THE INVENTION

The present invention pertains to a beverage press. In particular, the invention relates to a hand-operated coffee press.

BACKGROUND

Coffee is globally one of the world's most widely consumed beverages. It is generally made by extracting soluble components using hot water from so-called ground coffee. The taste of coffee however varies substantially, even with identical ground coffee as the starting material, depending upon the precise conditions under which the extraction is carried out.

A widely used method of making coffee comprises passing a relatively small quantity of hot water through a compacted block of coffee grounds under relatively high pressure in order to force the water through the block. This specific method of making coffee results in so-called espresso. In order to produce espresso, it is common to use a counter-top sized machine, which generally requires an electrical supply and a complex assembly of elements for generating hot water under pressure and expelling a quantity of it through a pot containing a compressed block of coffee grounds. Such apparatuses are unfortunately rather expensive, both in purchase as in maintenance.

Alternatively, hand-operated devices are available which do not require a power supply, nor do they require the amount of maintenance of regular, automated apparatuses. The fact that these devices are not fully automated however have the disadvantage that operation is a lot less intuitive and straightforward. Such a device is known from e.g. EP 1 509 112. While the coffee maker according to EP '112 allows for the brewing of espresso coffee, operation is not as intuitive as one would expect. In fact, the movement of the levers of the device disclosed in EP '112 is under control of the user, and can be controlled accordingly to expel hot water relatively slowly and at a relatively low pressure, or relatively fast at a considerably higher pressure. The mechanism of EP '112 however does not provide the user with the appropriate feedback during operation, such that the user can adjust the speed and pressure during operation. If the levers are not operated correctly, the user will simply not be able to obtain a the right and constant pressure, thus extraction of the coffee grounds will be incomplete. It is thus clear that the quality of the resulting coffee is completely dependent on the speed at which the user operates the levers. However, without the appropriate feedback, the user will only know that the built pressure was inadequate, and that his attempt at brewing a coffee has failed until after he has finished operation the device. A user without sufficient knowledge and/or operating skills would thus not be able to produce a qualitative espresso in an intuitive manner.

Another hand-operated coffee maker is known from U.S. Pat. No. 10,182,678. The device according to U.S. '678 shows the same disadvantages as the correct operation of the levers is completely at the discretion of the user. A user without sufficient knowledge and/or operating skills will not succeed in producing a pressure which is constant and/or sufficiently high in order to extract the coffee grounds and in order to obtain a qualitative espresso.

Accordingly, there remains a need in the art for a hand-operated coffee maker which allows intuitive and unambiguous operation, even by an unskilled user, resulting in the optimal pressure for brewing decent espresso coffee.

The present invention aims to resolve at least some of the problems and disadvantages mentioned above.

SUMMARY OF THE INVENTION

The present invention and embodiments thereof serve to provide a solution to one or more of above-mentioned disadvantages. To this end, the present invention relates to a hand-operated coffee press.

In particular the present invention is defined by the following, not limitative embodiments:

1. A hand-operated coffee press comprising:
   - a. a pressing assembly comprising a post, a pushing rod and a lever, wherein
     - i. said lever is rotably coupled to an axial end of said post, and wherein said lever and said post are configured to rotate about an eccentrical axis, and
     - ii. said lever is rotably coupled to an axial end of said pushing rod, and wherein said lever and said pushing rod are configured to rotate about a centrical axis,
   - b. a brewing assembly comprising a portafilter, a liquid container and a piston, wherein said piston is configured to move through the liquid container to compress a liquid through the portafilter, wherein the pushing rod of the pressing assembly is configured to actuate the piston of the brewing assembly, wherein the pushing rod comprises a first pin and the piston comprises a toothed comb, and wherein the first pin and the toothed comb are releasable coupled to each other.
2. The hand-operated coffee press according to embodiment 1, wherein the pressing assembly comprises a retention rod, said retention rod is rotably coupled to said post, and said retention rod comprises a second pin, wherein the second pin and the toothed comb are releasably coupled to each other.
3. The hand-operated coffee press according to embodiment 1 or 2, wherein the pressing assembly comprises a gas spring, said gas spring comprises a first end and a second end, said first end is coupled to the post, and said second end is coupled to the pushing rod.
4. The hand-operated coffee press according to any one of embodiments 1-3, wherein the pressing assembly comprises a first spring, said first spring is coupled to the pushing rod and to the post, and is configured to push the first pin towards the toothed comb.
5. The hand-operated coffee press according to any one of embodiments 2-4, wherein the pressing assembly comprises a second spring, said second spring is coupled to the retention rod and to the post, and is configured to push the second pin towards the toothed comb.
6. The hand-operated coffee press according to any one of embodiments 1-5, wherein the lever comprises a third pin, and the pushing rod comprises a sliding slot, said sliding slot having axial slot edges, wherein said third pin is slidably mounted in between said between said two axial slot edges.
7. The hand-operated coffee press according to embodiment 6, wherein a movement of the third pin from the first axial slot edge to the second axial slot edge corresponds to a movement of the first pin of the pushing rod over a distance between two consecutive teeth of the toothed comb.

8. The hand-operated coffee press according to embodiment 6 or 7, wherein a movement of the third pin beyond the first or second axial slot edge invokes a rotational movement of the pushing rod in respect to the toothed comb.
9. The hand-operated coffee press according to any one of embodiments 6-8, wherein the retention rod comprises a fourth pin, and the pushing rod comprises an indent, wherein said fourth pin and said indent are configured for a rotational movement of the pushing rod in respect to the toothed comb to invoke a corresponding rotational movement of the retention rod in respect to the toothed comb.
10. The hand-operated coffee press according to any one of embodiments 1-9, wherein the toothed comb of the piston comprises at least four teeth, preferably at least five teeth.
11. The hand-operated coffee press according to any one of embodiments 1-10, wherein the piston comprises a pressure-valve on the axial side facing the liquid container, allowing pressure control inside the liquid container.
12. The hand-operated coffee press according to any one of embodiments 1-11, wherein the liquid container comprises a liquid jet breaker on the side facing the portafilter, said jet breaker comprising a plurality of openings.
13. The hand-operated coffee press according to any one of embodiments 1-12, wherein the liquid container is removable from the brewing assembly.
14. A method of making a coffee with a hand-operated coffee press according to any one of embodiments 1-13.
15. The method according to claim 14, said coffee press comprising a pressing assembly and a brewing assembly, comprising the steps of:
    a. preparing the brewing assembly, said brewing assembly comprising a portafilter, a liquid container and a piston, wherein said piston is configured to move through the liquid container to compress a liquid through the portafilter, thereby
        i. filling the liquid container of the brewing assembly with a suitable extraction liquid,
        ii. filling the portafilter of the brewing assembly with a suitable substance to be extracted,
    b. operating the pressing assembly, said pressing assembly comprising a post, a pushing rod and a lever, wherein said lever is rotably coupled to an axial end of said post, and wherein said lever and said post are configured to rotate about an eccentrical axis, and said lever is rotably coupled to an axial end of said pushing rod, and wherein said lever and said pushing rod are configured to rotate about a centrical, wherein the pushing rod of the pressing assembly is configured to actuate the piston of the brewing assembly, said pushing rod comprises a first pin and the piston comprises a toothed comb, wherein the first pin and the toothed comb are releasable coupled to each other, and wherein said operating the pressing assembly comprises repeatedly operating the lever, thereby moving the piston through the liquid container, thus pressing the extraction liquid through the substance to be extracted, resulting in a prepared coffee leaving the portafilter.

FIGURES

FIG. 1A shows a front view of a hand-operated coffee press according to a preferred embodiment of the invention.

FIG. 1B shows a side view of a hand-operated coffee press according to a preferred embodiment of the invention.

FIG. 1C shows a back view of a hand-operated coffee press according to a preferred embodiment of the invention.

FIG. 2 shows a perspective view of a hand-operated coffee press according to a preferred embodiment of the invention.

FIG. 3A shows a cross-sectional side view of a hand-operated coffee press according to a preferred embodiment of the invention.

FIG. 3B shows another cross-sectional side view of a hand-operated coffee press according to a preferred embodiment of the invention.

FIG. 4 shows a portafilter and a liquid container according to a preferred embodiment of the invention.

FIG. 5 shows a cross-sectional side view of a piston according to a preferred embodiment of the invention.

DETAILED DESCRIPTION OF THE INVENTION

The present invention concerns a hand-operated coffee press.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a fiber" refers to one or more than one fiber.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments.

A first aspect of the present invention relates to a hand-operated coffee press comprising:

a. a pressing assembly comprising a post, a pushing rod and a lever, wherein
    i. said lever is rotably coupled to an axial end of said post, and wherein said lever and said post are configured to rotate about an eccentrical axis, and ii. said lever is rotably coupled to an axial end of said pushing rod, and wherein said lever and said pushing rod are configured to rotate about a centrical axis, b. a brewing assembly comprising a portafilter, a liquid container and a piston, wherein said piston is configured to move through the liquid container to compress a liquid through the portafilter, wherein the pushing rod of the pressing assembly is configured to actuate the piston of the brewing assembly, wherein the pushing rod comprises a first pin and the piston comprises a toothed comb, and wherein the first pin and the toothed comb are releasable coupled to each other.

A "pressing assembly" as described herein, relates to any means, or combination of means, suitable to be pressed by a user in order for the present coffee press to be operated.

In this respect, whereas other coffee making devices generally require an electrical supply, the present invention is driven by hand-operation of a user through the pressing assembly. In particular, the lever as herein described is operated by a user to convey a force onto the pushing rod, which in its turn actuates the piston.

In light of the present invention, a "brewing assembly" should be interpreted as any means, or combination of means, capable of brewing a beverage, in particular coffee. Alternatively, the brewing assembly of the present invention could be used for brewing tea, or other beverages based on extraction of solids, e.g. of ground coffee, tea, herbs, or combinations thereof. The brewing assembly therefore comprises a "portafilter" which is generally known in the art and should be interpreted as a holder for ground coffee. The brewing assembly further comprises a liquid container, which for the purpose of making coffee should be filled with hot, if not boiling, water. By actuating the piston, the water is compressed through the ground coffee, thus producing a beverage, in particular a coffee, more in particular an espresso. Alternatively, the present invention also allows the brewing of tea, infusions, or a combination thereof.

A "comb", more in particular a "toothed comb" as described herein, indicates a specifically shaped element of the piston, which comprises a plurality of rigid teeth, each of said teeth configured substantially perpendicular relative to the longitudinal line of the piston, wherein said teeth are configured such that in between each pair of teeth a pin, in particular the first pin according to the present invention, can be releasably coupled.

In light of the present invention, a "pushing rod" relates to a rod which through a pushing movement is able to actuate the piston. The pushing rod thereto comprises a first pin which is releasably coupled to the piston, in particular to the toothed comb of the piston. As a result, the piston can be pushed towards the brewing assembly, in particular through the liquid container.

The configuration of the pressing assembly as herein described has the advantage that operation of the lever does not correspond to a complete movement of the piston from its start position, i.e. removed the furthest from the liquid container, to its end position, i.e. moved the furthest inside the liquid container. Instead, operation of the lever corresponds to a travel of the piston which is only incremental, and which only corresponds to a pre-defined distance between two or more teeth.

Repeated operation of the lever thus corresponds to the following sequence of events:

the first pin is coupled to an initial tooth of the toothed comb;

upon operation of the lever towards its advanced position, the first pin of the pushing rod pushes the piston towards the liquid container, upon operation of the lever back to its starting position, the first pin releases from the initial tooth, travels towards a subsequent tooth and releasably couples thereto.

As a result, repeated operation of the lever results in the piston moving in pre-defined increments from its start position to its end position, thus intuitively obtaining optimal pressure and brewing time, and providing the user with live feedback during operation. As a matter of fact, the user will feel the counter-pressure and speed of the mechanism, thus receiving valuable feedback during operation. As a result, a user does not need to have substantial knowledge about how to operate the device, how fast the lever should be pressed, nor about how different operation speeds could influence brewing time, pressure, extraction, and final quality of the obtained coffee. The user will build sufficient operating experience upon using the present coffee press, and will intuitively learn and/or know how to prepare a good coffee.

By preference, the pressing assembly of the hand-operated coffee press comprises a retention rod, said retention rod is rotably coupled to said post, and said retention rod comprises a second pin, wherein the second pin and the toothed comb are releasably coupled to each other.

The term "retention rod" herein relates to a rod which is able to retain the piston into an advanced position relative to the toothed comb and herein comprises a second pin which is releasably coupled to the toothed comb. Repeated operation of the lever thus corresponds to the following sequence of events:

the first and the second pin are coupled to a first initial tooth and a second initial tooth of the toothed comb;

upon operation of the lever towards its advanced position, the first pin of the pushing rod pushes the piston towards the liquid container, meanwhile the second pin releases from the second initial tooth allowing movement of the liquid container;

upon operation of the lever back to its starting position, the second pin couples to a subsequent second tooth, thereby retaining the piston in its advanced position, meanwhile the first pin releases from the first initial tooth, travels towards a subsequent first tooth and releasably couples thereto.

As a result, repeated operation of the lever results in the piston moving in pre-defined increments from its starting position to its end position, wherein the first pin is the driving force moving the piston into an advanced position, while the second pin is the retaining force avoiding the piston to move back to its starting position. As such, by the present configuration the piston is only allowed a one-way movement, from its start position towards its end position, i.e. towards and inside the liquid container.

According to a further or another embodiment, the pressing assembly comprises a gas spring, said gas spring comprises a first end and a second end, said first end is coupled to the post, and said second end is coupled to the pushing rod.

In light of the present invention, the term "gas spring" is to be interpreted as a type of spring that, unlike a typical mechanical spring that relies on elastic deformation, uses compressed gas contained within an enclosed cylinder sealed by a sliding piston to pneumatically store potential energy and withstand external force applied parallel to the direction of the piston shaft. According to the present embodiments, the gas spring exerts a pressure which aims at moving the piston back to its start position, and is particularly useful to restore the pressing assembly into its initial state. In a working state, the coffee press will thus allow the incremental movement of the piston from its start position towards its end position by operation of the lever. Once the advancement of the piston to its end position has completed, the gas spring is able to push the piston back towards its start position, allowing the start of a new operation cycle and further improving the usability of the coffee press.

In some embodiments, the pressing assembly comprises a first spring, said first spring is coupled to the pushing rod and to the post, and is configured to push the first pin towards the toothed comb.

Herein, a “spring” relates to an elastic object that stores mechanical energy. Springs are typically made of spring steel. The spring as described herein pushes the first pin towards the toothed comb, and thus further improves the configuration wherein the first pin, and thus the pushing rod, is releasably coupled to the toothed comb, allowing smooth operation of the pressing assembly and providing for adequate movement of the piston towards an advanced position.

According to a further or another embodiment, the pressing assembly comprises a second spring, said second spring is coupled to the retention rod and to the post, and is configured to push the second pin towards the toothed comb. The spring as described herein pushes the second pin towards the toothed comb, and thus further improves the configuration wherein the second pin, and thus the retention rod, is releasably coupled to the toothed comb, allowing smooth operation of the pressing assembly and providing for adequate retention of the piston.

The lever, according to some embodiments, comprises a third pin, and the pushing rod comprises a sliding slot, said sliding slot having axial slot edges, wherein said third pin is slidably mounted in between said between said two axial slot edges. The presence of the sliding slot comprising two axial slot edges allows the definition of two boundaries of movement of the lever. As such, it is clear to the user in between which positions the lever should be operated in order to effectively operate the pushing mechanism of the coffee press.

By preference, a movement of the third pin from the first axial slot edge to the second axial slot edge herein corresponds to a movement of the first pin of the pushing rod over a distance between two consecutive teeth of the toothed comb, allowing the incremental advancement of the piston with each lever operation.

According to a further or another embodiment, a movement of the third pin beyond the first or second axial slot edge herein invokes a rotational movement of the pushing rod in respect to the toothed comb. As such, by pushing the lever further than the boundaries as defined by the axial slot edges, the pushing rod can be rotated away from the toothed comb, thereby releasing the first pin from the toothed comb.

In some embodiments of the hand-operated coffee press according to the present invention, the retention rod comprises a fourth pin, and the pushing rod comprises an indent, wherein said fourth pin and said indent are configured for a rotational movement of the pushing rod in respect to the toothed comb to invoke a corresponding rotational movement of the retention rod in respect to the toothed comb. As such, by pushing the lever further than the boundaries as defined by the axial slot edges, the pushing rod can be rotated away from the toothed comb, thereby releasing the first pin from the toothed comb. At the same time, the fourth pin of the retention rod hooks into the indent of the pushing rod, whereby the retention rod can be rotated away from the toothed comb, thereby releasing the second pin from the toothed comb. In this configuration, a movement of the lever further than the boundaries as defined by the axial slot edges, thus rotates both the pushing rod as the retention rod, decoupling both the first pin and the second pin from the toothed comb of the piston. As such, said lever movement completely decouples the piston, allowing it to be returned towards its starting position.

In these embodiments, a typical operation of the coffee press by a user, will thus comprise the repeated operation of the lever, resulting in a movement of the piston from its start position towards its end position, followed by a continued operation of the lever further than the boundaries as defined by the axial slot edges, consequently resulting in decoupling of the piston, which is allowed to move back towards its starting position.

Some embodiments of the present invention relate to the hand-operated coffee press, wherein the toothed comb of the piston comprises at least four teeth. The presence of four teeth on the toothed comb thus relates to an operation in three steps. By preference, the toothed comb of the piston comprises at least five teeth, more by preference at least six teeth, even more by preference at least seven teeth.

According to some embodiments, the teeth of the toothed comb, have a height of between 2 and 20 mm. By preference, the teeth of the toothed comb have a height of between 3 and 9 mm, more by preference of between 5 and 7 mm.

Some embodiments comprise each individual tooth of the toothed comb being between 4 and 40 mm apart from a consecutive, individual tooth. By preference, consecutive teeth are spaced between 6 and 18 mm apart from each other, more by preference between 10 and 12 mm apart from each other.

According to a further or another embodiment, the piston comprises a pressure-valve on the axial side facing the liquid container, allowing pressure control inside the liquid container.

The term “pressure valve”, “relief valve” or “pressure relief valve (PRV)” relates to a type of safety valve used to control or limit the pressure in a system. Pressure might otherwise build up and create a process upset, instrument or equipment failure, or fire.

The pressure is relieved by allowing the pressurized fluid to flow from an auxiliary passage out of the system. The relief valve is generally designed or set to open at a predetermined set pressure to protect pressure vessels and other equipment from being subjected to pressures that exceed their design limits. When the set pressure is exceeded, the relief valve becomes the “path of least resistance” as the valve is forced open and a portion of the fluid is diverted through the auxiliary route.

The presence of a pressure valve herein serves to avoid overpressure inside the brewing assembly. As such, the pressure valve preferably keeps the pressure in the brewing assembly between 0 and 25 bar, more preferably between 0 and 20 bar.

The liquid container, according to some embodiments, comprises a liquid jet breaker on the side facing the portafilter, said jet breaker comprising a plurality of openings. The presence of the liquid jet breaker thus allows for an even water distribution inside the portafilter, allowing optimal extraction of ground coffee.

The hand-operated coffee press according to some embodiments, comprises a liquid container which is removable from the brewing assembly. This way, the liquid container can either be filled while assembled within the brewing assembly, or otherwise be filed while being removed from the brewing assembly.

A second aspect of the present invention concerns a method of making a coffee with a hand-operated coffee press, said coffee press comprising a pressing assembly and a brewing assembly, comprising the steps of:

a. preparing the brewing assembly, said brewing assembly comprising a portafilter, a liquid container and a piston, wherein said piston is configured to move through the liquid container to compress a liquid through the portafilter, thereby
   i. filling the liquid container of the brewing assembly with a suitable extraction liquid,
   ii. filling the portafilter of the brewing assembly with a suitable substance to be extracted, and
b. operating the pressing assembly, said pressing assembly comprising a post, a pushing rod and a lever, wherein said lever is rotably coupled to an axial end of said post, and wherein said lever and said post are configured to rotate about an eccentrical axis, and said lever is rotably coupled to an axial end of said pushing rod, and wherein said lever and said pushing rod are configured to rotate about a centrical axis, wherein the pushing rod of the pressing assembly is configured to actuate the piston of the brewing assembly, said pushing rod comprises a first pin and the piston comprises a toothed comb, wherein the first pin and the toothed comb are releasable coupled to each other, and wherein said operating the pressing assembly comprises repeatedly operating the lever, thereby moving the piston through the liquid container, thus pressing the extraction liquid through the substance to be extracted, resulting in a prepared coffee leaving the portafilter.

In light of the above, and in particular regarding coffee to be the beverage of choice, the term "extraction liquid" relates to water, while the "substance to be extracted" relates to ground coffee. Alternatively, the substance to be extracted could be tea or equivalents thereof. The extraction liquid is preferably brought to a temperature between 20 and 100° C. before bringing it into the liquid container. By preference, the extraction liquid is brought to a temperature of between 90 and 98° C., more by preference between 92 and 96° C. Said temperatures allow for optimal extraction of ground coffee through the coffee press according to the present invention.

By preference, the hand-operated coffee press as disclosed by the present method, is a coffee press according to any one of the embodiments of the first aspect of the present invention.

DESCRIPTION OF FIGURES

The invention is further described by the following figures which illustrate the invention, and are not intended to, nor should they be interpreted to, limit the scope of the invention.

Figure 1A:
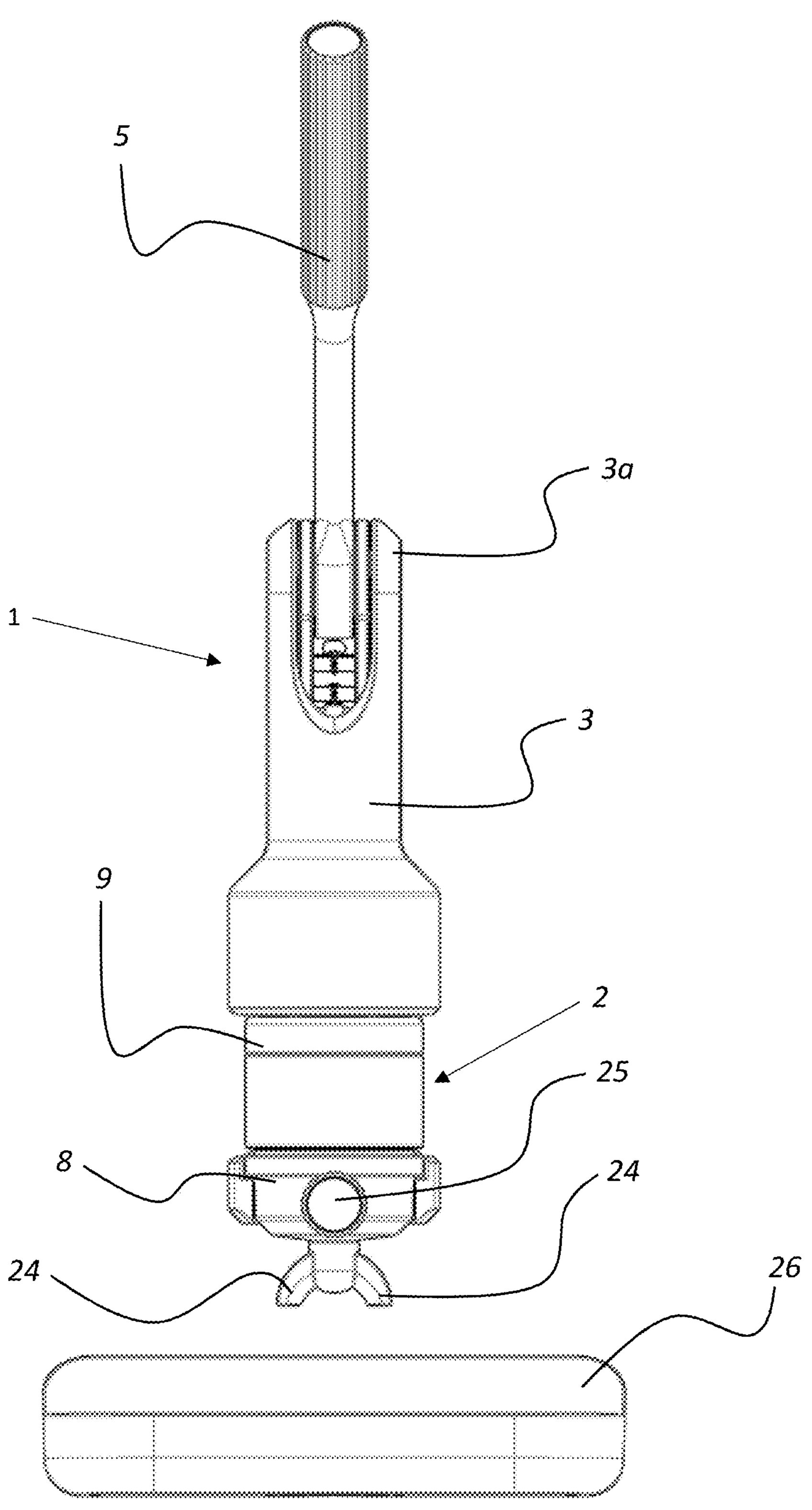
FIGS. 1A, 1B and 1C respectively show a front, side and back view of a hand-operated coffee press according to a preferred embodiment of the invention.
Figure 1B:
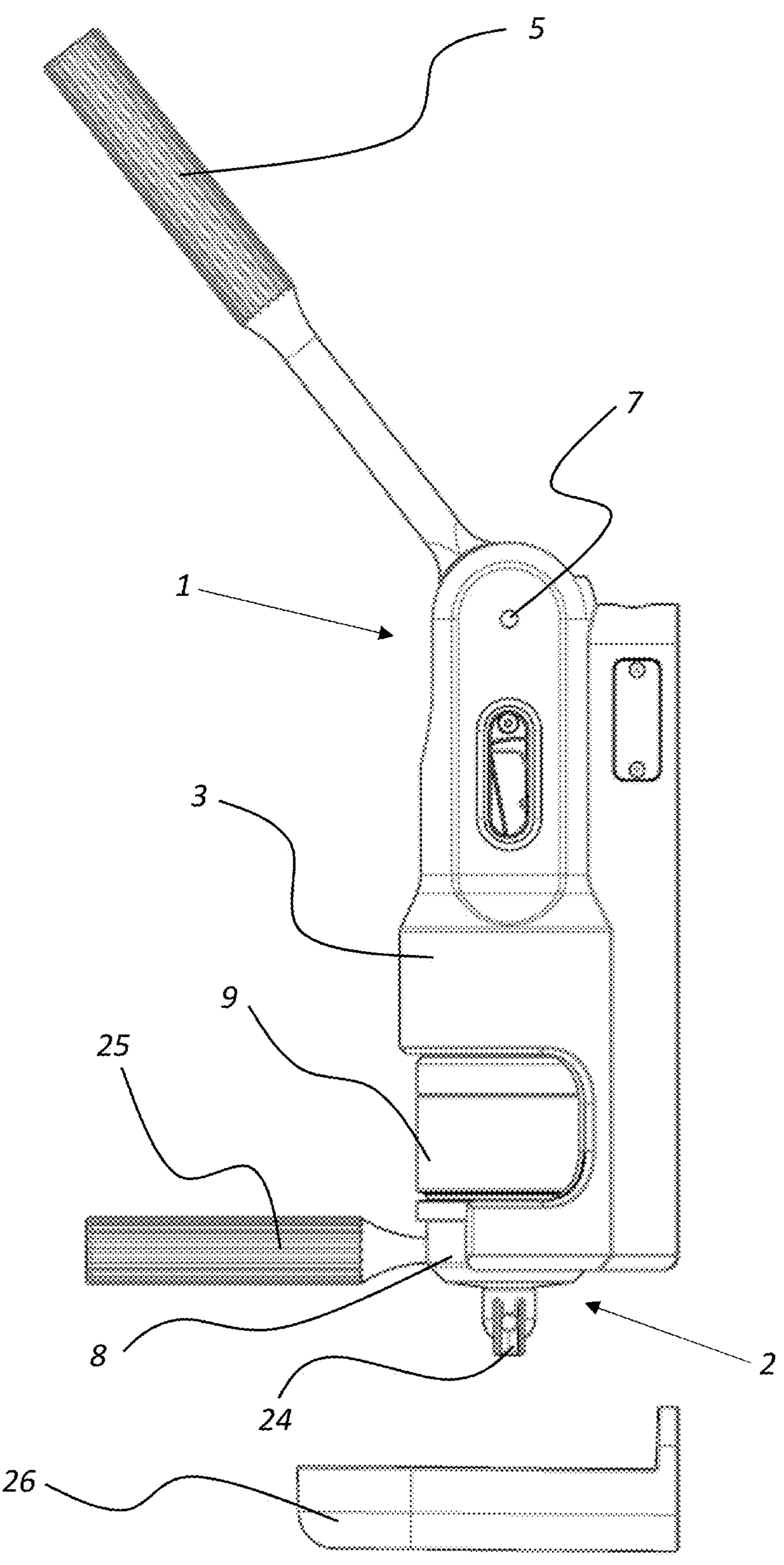
Figure 1C:
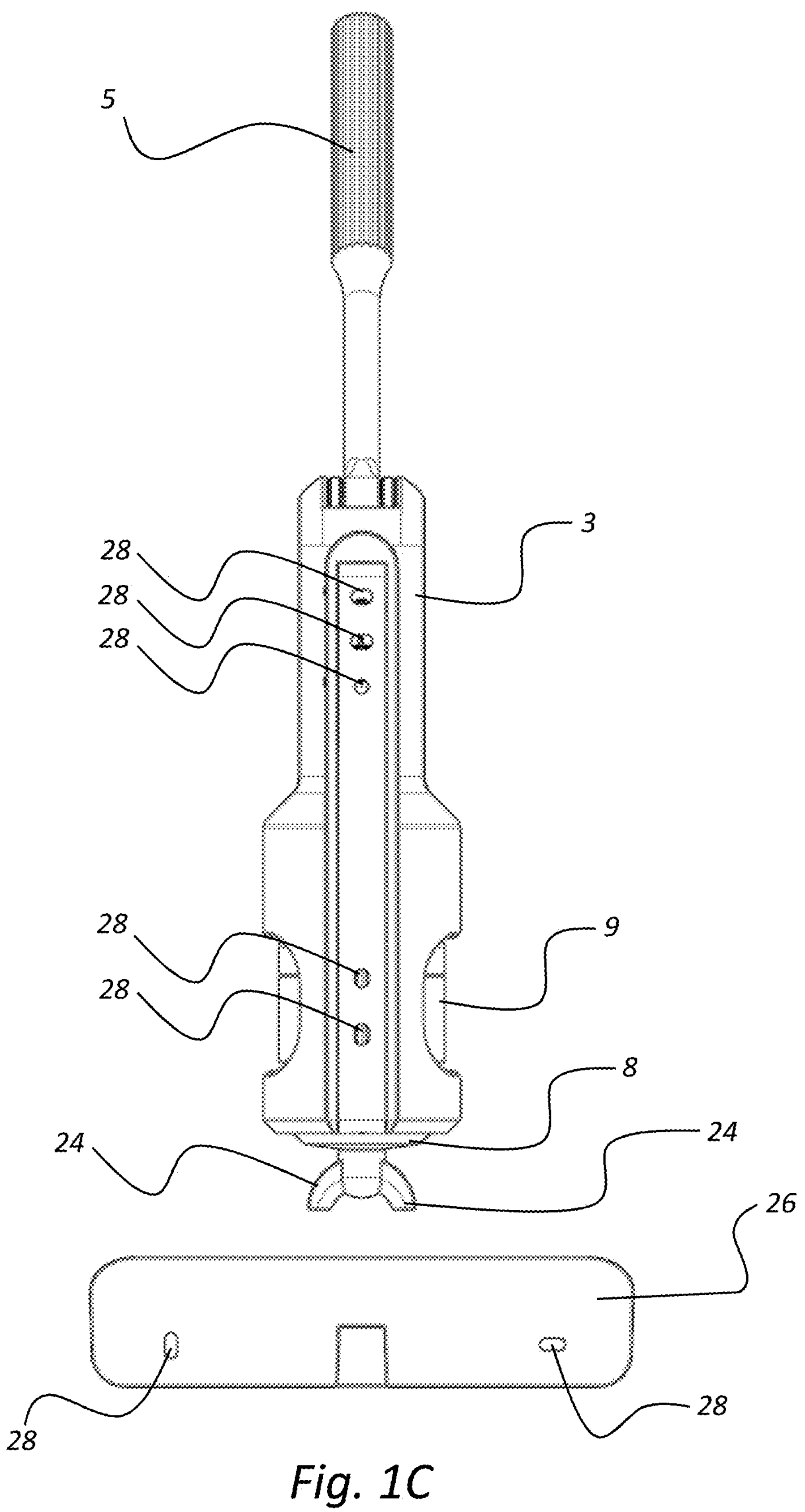
Figure 2:
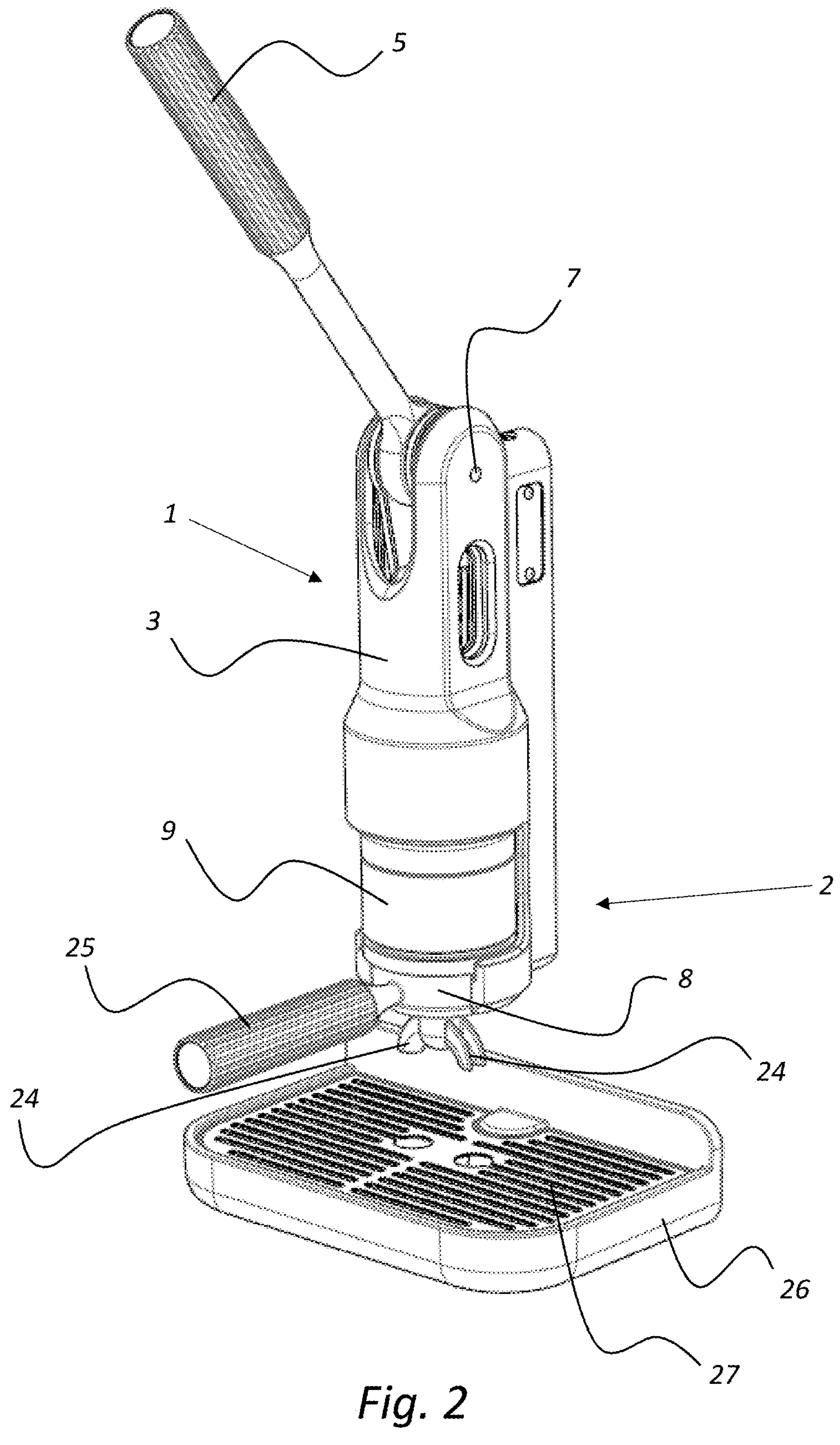
FIG. 2 shows a perspective view of a hand-operated coffee press according to a preferred embodiment of the invention. Furthermore, FIGS. 3A and 3B serve to better illustrate the internals of the coffee press, showing a cross-sectional side view of a hand-operated coffee press according to a preferred embodiment of the invention.
Figure 3A:
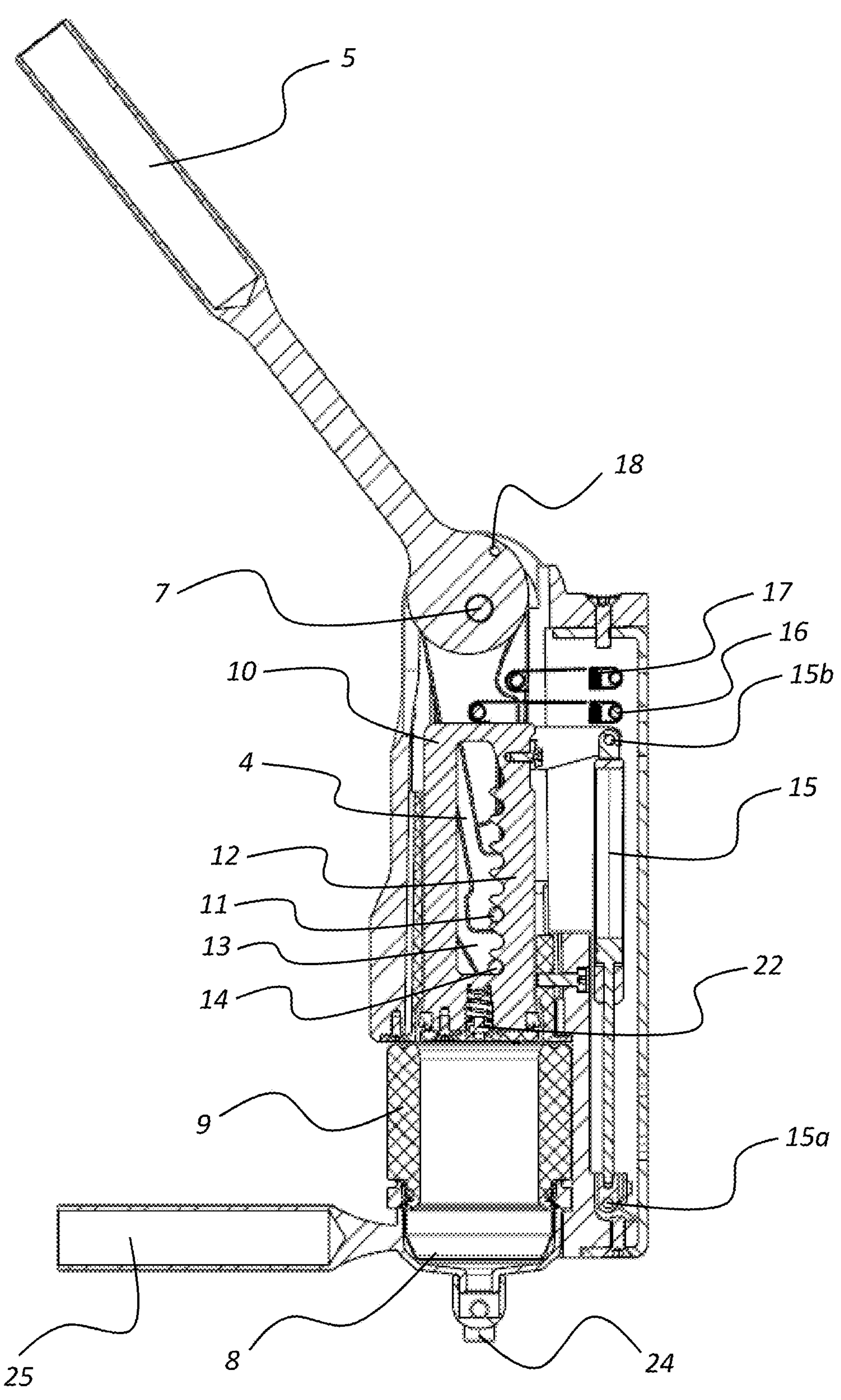
Figure 3B:
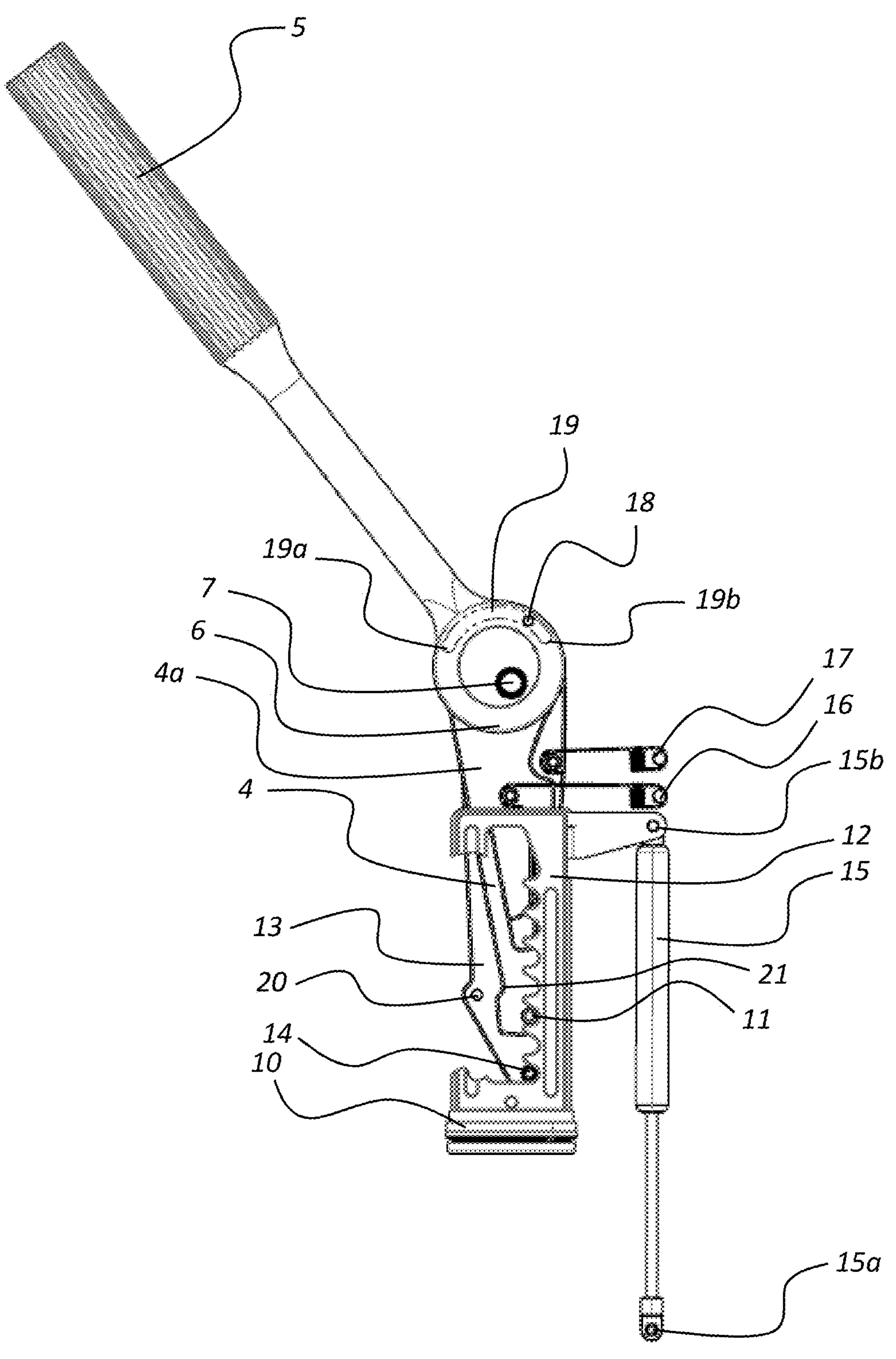

The hand-operated coffee press herein shows a pressing assembly 1 comprising a post 3, a pushing rod 4 and a lever 5, wherein the lever 5 is rotably coupled to an axial end 3*a* of said post 3. The coffee press further comprises a brewing assembly 2 comprising a portafilter 8, a liquid container 9 and a piston, wherein said piston is configured to move through the liquid container 9 to compress a liquid through the portafilter 8. It is further shown that said lever 5 and said post 3 are configured to rotate about an eccentrical axis 7. Herein, lever 5 is furthermore rotably coupled to an axial end 4*a* of said pushing rod 4, wherein said lever 5 and said pushing rod 4 are configured to rotate about a centrical axis 6. The pushing rod 4 of the pressing assembly 1 is configured to actuate the piston 10 of the brewing assembly 2, wherein the pushing rod 4 comprises a first pin 11 and the piston 10 comprises a toothed comb 12, wherein the first pin 11 and the toothed comb 12 are releasable coupled to each other. The coffee press allows operation of the lever 5 corresponding to a travel of the piston 10 which is only incremental, and which only corresponds to a pre-defined distance between two or more teeth. Repeated operation of the lever 5 results in the piston 10 moving in pre-defined increments from its start position to its end position, thus intuitively obtaining optimal pressure and brewing time. As a result, a user does not need to have substantial knowledge about how to operate the device, how fast the lever 5 should be pressed, nor about how different operation speeds could influence brewing time, pressure, extraction, and final quality of the obtained coffee. Instead, the mechanism will provide the user with live feedback during operation, allowing the user to feel the counter-pressure and speed of the mechanism. As a result, the user will build sufficient operating experience upon using the present coffee press, and will intuitively learn and/or know how to prepare a good coffee without requiring substantial knowledge beforehand. For further ease of use, the coffee press be provided with one or more connective means 28 for connecting the coffee press to e.g. a wall. The coffee press may furthermore provide for a cup stand and/or liquid collection container 26, which comprises a grille 27 in order for any spilled liquid to seep through and be collected.

The pressing assembly 1 of the hand-operated coffee press comprises a retention rod 13, said retention rod 13 is rotably coupled to said post 3, and said retention rod 13 comprises a second pin 14, wherein the second pin 14 and the toothed comb 12 are releasably coupled to each other. Repeated operation of the lever 5 results in the piston 10 moving in pre-defined increments from its starting position to its end position, wherein the first pin 11 is the driving force moving the piston 10 into an advanced position, while the second pin 14 is the retaining force avoiding the piston 10 to move back to its starting position. As such, by the present configuration the piston 10 is only allowed a one-way movement, from its start position towards its end position, i.e. towards and inside the liquid container 9.

Further shown is a gas spring 15, said gas spring 15 comprises a first end 15*a* and a second end 15*b*, said first end 15*a* is coupled to the post 3, and said second end 15*b* is coupled to the pushing rod 4. The gas spring 15 exerts a pressure which aims at moving the piston 10 back to its start position, and is particularly useful to restore the pressing assembly 1 into its initial state. The pressing assembly 1 furthermore comprises a first spring 16, said first spring 16 is coupled to the pushing rod 4 and to the post 3, and is configured to push the first pin 11 towards the toothed comb 12. Similarly, a second spring 17 is provided, said second spring 17 is coupled to the retention rod 13 and to the post 3, and is configured to push the second pin 14 towards the toothed comb 12.

It is further shown that the lever 5 may comprise a third pin 18, and that the pushing rod 4 thereto may comprise a sliding slot 19, said sliding slot 19 having axial slot edges 19*a*,19*b*, wherein said third pin 18 is slidably mounted in between said between said two axial slot edges 19*a*,19*b*. The presence of the sliding slot 19 comprising two axial slot edges 19*a*,19*b* allows the definition of two boundaries of movement of the lever 5. A movement of the third pin 18 from the first axial slot edge 19*a* to the second axial slot edge 19*b* herein corresponds to a movement of the first pin 11 of the pushing rod 4 over a distance between two consecutive teeth of the toothed comb 12, allowing the incremental advancement of the piston 10 with each lever 5 operation. Movement of the third pin 18 beyond the first 19*a* or second axial slot edge 19*b* herein invokes a rotational movement of the pushing rod 4 in respect to the toothed comb 12. As such, by pushing the lever 5 further than the boundaries as defined by the axial slot edges 19*a*,19*b*, the pushing rod 4 can be rotated away from the toothed comb 12, thereby releasing the first pin 11 from the toothed comb 12. Furthermore, the retention rod may comprise a fourth pin 20, and the pushing rod 4 may therefore comprise an indent 21, wherein said fourth pin 20 and said indent 21 are configured for a rotational movement of the pushing rod 4 in respect to the toothed comb 12 to invoke a corresponding rotational movement of the retention rod 13 in respect to the toothed comb 12. As such, by pushing the lever 5 further than the boundaries as defined by the axial slot edges 19*a*,19*b*, the pushing rod 4 can be rotated away from the toothed comb 12, thereby releasing the first pin 11 from the toothed comb 12. At the same time, the fourth pin 20 of the retention rod 13 hooks into the indent 21 of the pushing rod 4, whereby the retention rod 13 can be rotated away from the toothed comb 12, thereby releasing the second pin 14 from the toothed comb 12. In this configuration, a movement of the lever 5 further than the boundaries as defined by the axial slot edges 19*a*,19*b*, thus rotates both the pushing rod 4 as the retention rod 13, decoupling both the first pin 11 and the second pin 14 from the toothed comb 12 of the piston 10. As such, said lever 5 movement completely decouples the piston 10, allowing it to be returned towards its starting position.

Figure 5:
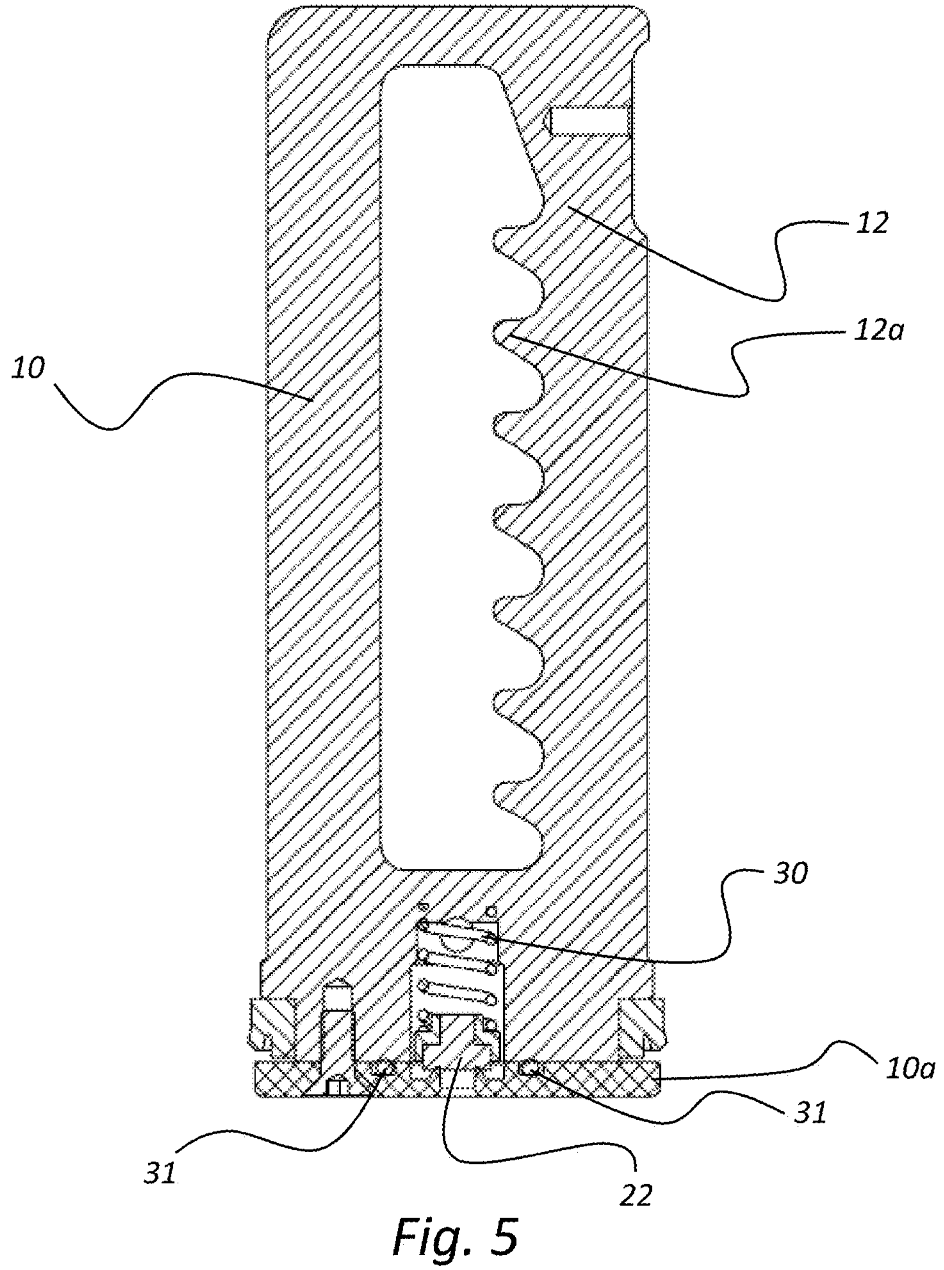

It is shown in the Figures that the piston 10 may comprise a pressure-valve 22 on the axial side facing the liquid container 9, allowing pressure control inside the liquid container 9. To provide for more detail, FIG. 5 shows a cross-sectional side view of a piston 10 according to a preferred embodiment of the invention. The presence of a pressure valve 22 herein serves to avoid overpressure inside the brewing assembly 2. The pressure valve 22 thereto comprises a spring 30, providing for the right amount of pressure on the inside of the piston 10. It is further shown that the piston 10 is provided with a toothed comb 12, comprising a plurality of teeth 12*a*. Facing the liquid container, the piston 10 comprises a piston plate 10*a* which liquid- and airtightly fitted onto the piston 10 using multiple bearings 31.

Figure 4:
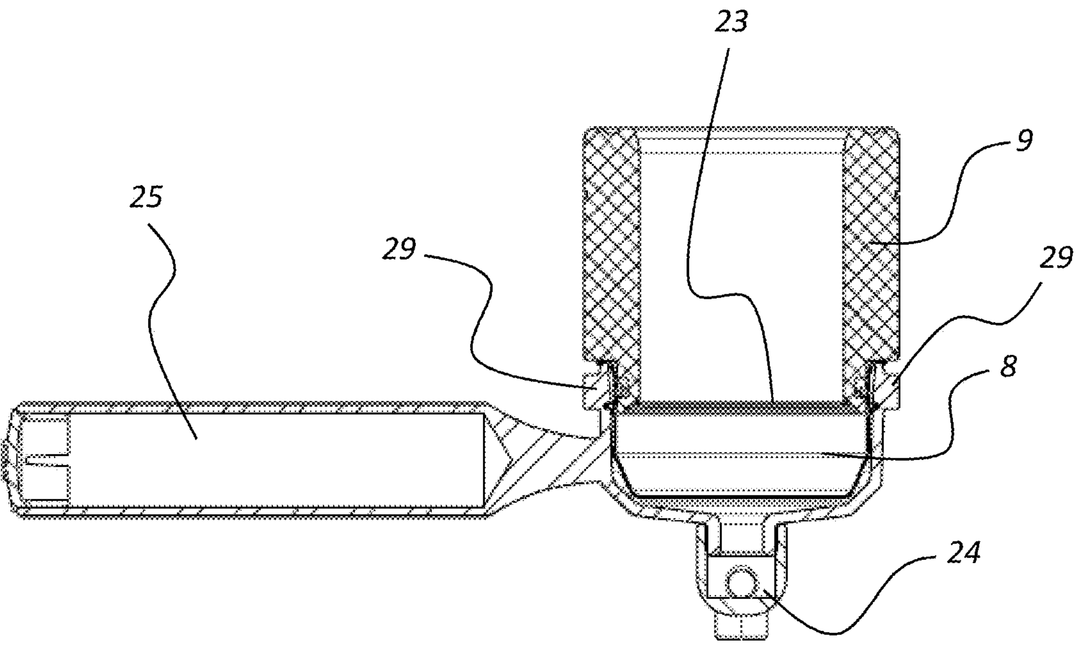

FIG. 4 furthermore shows a portafilter 8 and a liquid container 9 according to a preferred embodiment of the invention. The liquid container 9 herein comprises a liquid jet breaker 23 on the side facing the portafilter 8, said jet breaker 22 comprising a plurality of openings. The presence of the liquid jet breaker 22 thus allows for an even water distribution inside the portafilter 8, allowing optimal extraction of ground coffee. The portafilter 8 is provided with a handle 25 and one or two outlets 24 through which the prepared coffee leaves the coffee press. The liquid container 9 is removable from the coffee press and rests on the portafilter 8 through fitting means 29 of the portafilter 8.

LIST OF NUMBERED ITEMS

1 pressing assembly
2 brewing assembly
3 post
3*a* axial end of post
4 pushing rod
4*a* axial end of pushing rod
5 lever
6 centrical axis
7 eccentrical axis
8 portafilter
9 liquid container
10 piston
10*a* piston plate
11 first pin of pushing rod
12 toothed comb
12*a* individual tooth
13 retention rod
14 second pin of retention rod
15 gas spring
15*a* first end of gas spring
15*b* second end of gas spring
16 first spring of pressing assembly
17 second spring of pressing assembly
18 third pin of lever
19 sliding slot of pushing rod
19*a* first axial end of sliding slot
19*b* second axial end of sliding slot
20 fourth pin of retention rod
21 indent of pushing rod
22 pressure valve
23 liquid jet breaker
24 outlet of the portafilter
25 handle of the portafilter
26 cup stand and/or liquid collection container
27 grille of the liquid collection container
28 connective means
29 fitting means of the portafilter
30 spring of the pressure valve
31 bearing of piston plate

The invention claimed is:

1. A hand-operated coffee press comprising:

a. a pressing assembly comprising a post, a pushing rod and a lever, wherein
  i. said lever is rotatably coupled to an axial end of said post, and wherein said lever and said post are configured to rotate about an eccentrical axis, and
  ii. said lever is rotatably coupled to an axial end of said pushing rod, and wherein said lever and said pushing rod are configured to rotate about a centrical axis, b. a brewing assembly comprising a portafilter, a liquid container and a piston, wherein said piston is configured to move through the liquid container to compress a liquid through the portafilter, wherein the pushing rod of the pressing assembly is configured to actuate the piston of the brewing assembly, wherein the pushing rod comprises a first pin and the piston comprises a toothed comb, and wherein the first pin and the toothed comb are releasably coupled to each other.

2. The hand-operated coffee press according to claim 1, wherein the pressing assembly comprises a retention rod, said retention rod is rotatably coupled to said post, and said retention rod comprises a second pin, wherein the second pin and the toothed comb are releasably coupled to each other.

3. The hand-operated coffee press according to claim 1, wherein the pressing assembly comprises a gas spring, said gas spring comprises a first end and a second end, said first end is coupled to the post, and said second end is coupled to the pushing rod.

4. The hand-operated coffee press according to claim 1, wherein the pressing assembly comprises a first spring, said first spring is coupled to the pushing rod and to the post, and is configured to push the first pin towards the toothed comb.

5. The hand-operated coffee press according to claim 2, wherein the pressing assembly comprises a second pin spring, said second pin spring is coupled to the retention rod and to the post, and is configured to push the second pin towards the toothed comb.

6. The hand-operated coffee press according to claim 1, wherein the lever comprises a lever pin, and the pushing rod comprises a sliding slot, said sliding slot having axial slot edges, wherein said lever pin is slidably mounted in between said between two axial slot edges.

7. The hand-operated coffee press according to claim 6, wherein a movement of the lever pin from the first axial slot edge to the second axial slot edge corresponds to a movement of the first pin of the pushing rod over a distance between two consecutive teeth of the toothed comb.

8. The hand-operated coffee press according to claim 6, wherein a movement of the lever pin beyond the first or second axial slot edge invokes a rotational movement of the pushing rod in respect to the toothed comb.

9. The hand-operated coffee press according to claim 6, wherein a retention rod comprises a retention pin, and the pushing rod comprises an indent, wherein said retention pin and said indent are configured for a rotational movement of the pushing rod in respect to the toothed comb to invoke a corresponding rotational movement of the retention rod in respect to the toothed comb.

10. The hand-operated coffee press according to claim 1, wherein the toothed comb of the piston comprises at least four teeth.

11. The hand-operated coffee press according to claim 1, wherein the piston comprises a pressure-valve on an axial side facing the liquid container, allowing pressure control inside the liquid container.

12. The hand-operated coffee press according to claim 1, wherein the liquid container comprises a liquid jet breaker on a side facing the portafilter, said jet breaker comprising a plurality of openings.

13. The hand-operated coffee press according to claim 1, wherein the liquid container is removable from the brewing assembly.

14. A method of making a coffee with the hand-operated coffee press according to claim 1.

15. The method according to claim 14, comprising the steps of:

a. preparing the brewing assembly, said brewing assembly comprising the portafilter, the liquid container and the piston, wherein said piston is configured to move through the liquid container to compress the liquid through the portafilter, thereby
   i. filling the liquid container of the brewing assembly with a suitable extraction liquid,
   ii. filling the portafilter of the brewing assembly with a suitable substance to be extracted, b. operating the pressing assembly, said pressing assembly comprising the post, the pushing rod and the lever, wherein said lever is rotatably coupled to the axial end of said post, and wherein said lever and said post are configured to rotate about the eccentrical axis, and said lever is rotatably coupled to the axial end of said pushing rod, and wherein said lever and said pushing rod are configured to rotate about the centrical axis, wherein the pushing rod of the pressing assembly is configured to actuate the piston of the brewing assembly, said pushing rod comprises the first pin and the piston comprises the toothed comb, wherein the first pin and the toothed comb are releasably coupled to each other, and wherein said operating the pressing assembly comprises repeatedly operating the lever, thereby moving the piston through the liquid container, thus pressing the extraction liquid through the substance to be extracted, resulting in a prepared coffee leaving the portafilter.

* * * * *